US012308620B2

(12) United States Patent
Kikai et al.

(10) Patent No.: US 12,308,620 B2
(45) Date of Patent: May 20, 2025

(54) SPARK PLUG

(71) Applicant: Niterra Co., Ltd., Nagoya (JP)

(72) Inventors: Takaaki Kikai, Nagoya (JP); Satoshi Noguchi, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/543,334

(22) Filed: Dec. 18, 2023

(65) Prior Publication Data

US 2024/0243557 A1 Jul. 18, 2024

(30) Foreign Application Priority Data

Jan. 16, 2023 (JP) ................................ 2023-004342

(51) Int. Cl.
*H01T 13/54* (2006.01)
*H01T 13/32* (2006.01)

(52) U.S. Cl.
CPC ............ *H01T 13/54* (2013.01); *H01T 13/32* (2013.01)

(58) Field of Classification Search
CPC ......... H01T 13/54; H01T 13/32; H01T 13/16; H01T 13/20; H01T 13/02; H01T 13/34
See application file for complete search history.

(56) References Cited

U.S. PATENT DOCUMENTS 11,552,456 B1 * 1/2023 Lykowski .............. H01T 13/08
11,715,933 B2 8/2023 Ban et al.
2020/0295540 A1 * 9/2020 Ban ......................... H01T 13/54
2021/0399532 A1 * 12/2021 Ban ......................... H01T 13/54
2022/0094141 A1 * 3/2022 Saito ....................... H01T 13/32
2022/0360051 A1 * 11/2022 Ban ......................... H01T 13/08
2023/0106076 A1 * 4/2023 Gozawa ................. H01T 13/54 313/143
2024/0243556 A1 * 7/2024 Imai ........................ H01T 13/20
2024/0250507 A1 * 7/2024 Imai ........................ H01T 13/32

FOREIGN PATENT DOCUMENTS

WO WO-2021/140756 A1 7/2021
WO WO-2021239415 A1 * 12/2021 ............ H01T 13/32

* cited by examiner

*Primary Examiner* — Zheng Song
*Assistant Examiner* — Glenn D Zimmerman
(74) *Attorney, Agent, or Firm* — RENNER, OTTO, BOISSELLE & SKLAR, LLP

(57) ABSTRACT

To provide a spark plug that can ensure the strength of a melt portion, the spark plug includes: a center electrode; a metal shell in which the center electrode is insulated and held, the metal shell including a cylindrical portion having an outer circumference provided with an external thread, the metal shell further including a hole penetrating the cylindrical portion in a radial direction; and a ground electrode protruding from the metal shell toward the center electrode and connected, in the hole, to the cylindrical portion via a melt portion. In a cross section including a center line of the hole and the melt portion, the melt portion has a part in contact with the cylindrical portion, and the part is present on an outer side in the radial direction relative to the ground electrode.

4 Claims, 4 Drawing Sheets

[FIG. 1]
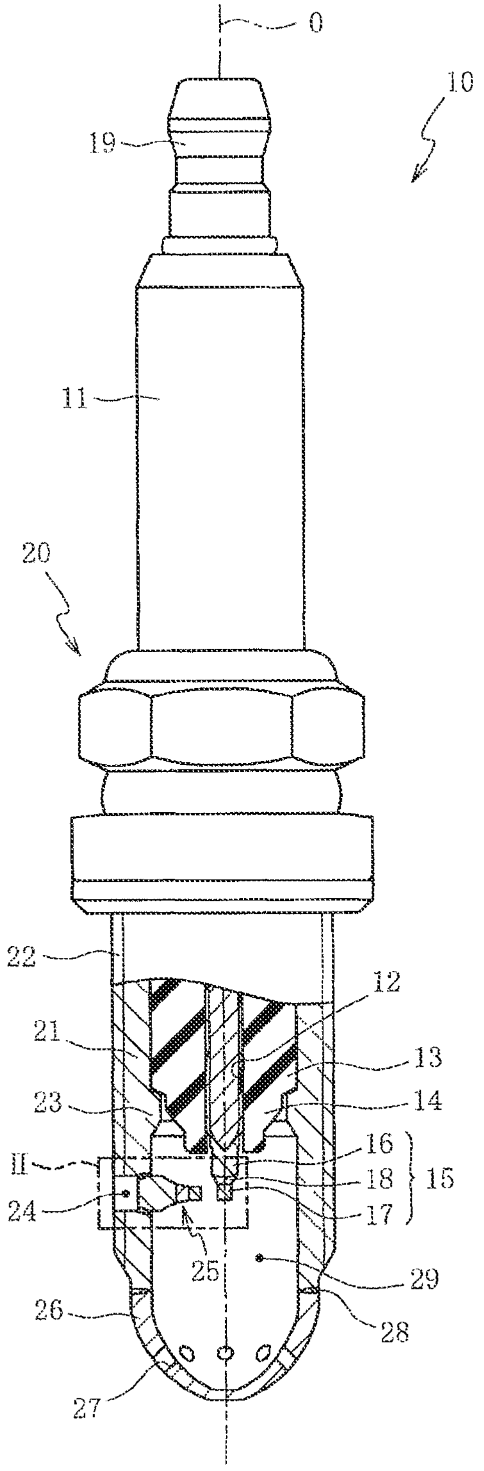

[FIG. 2]
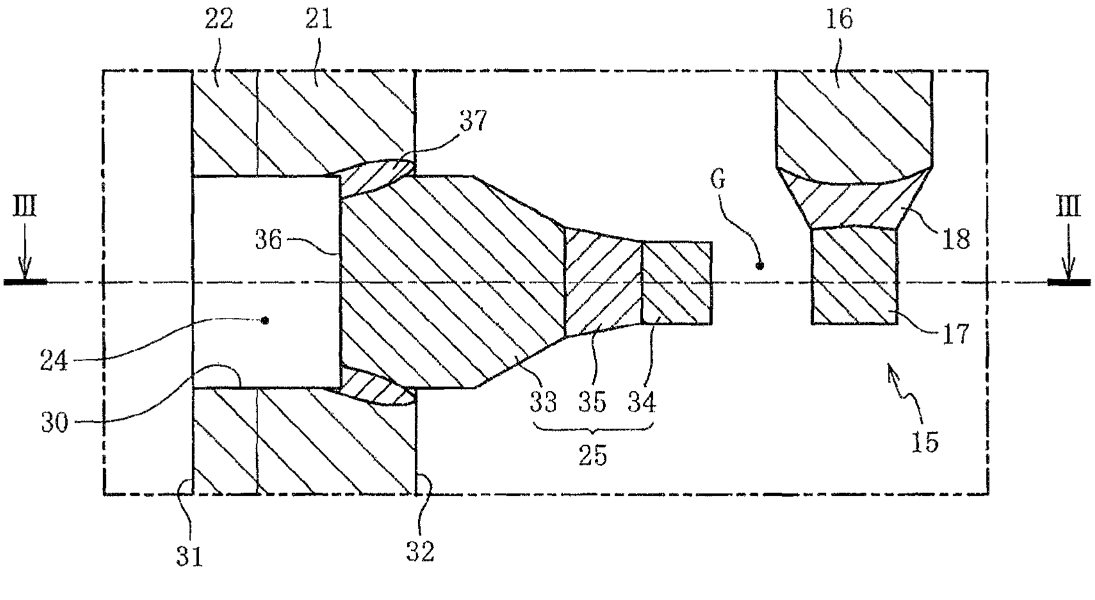

[FIG. 3]
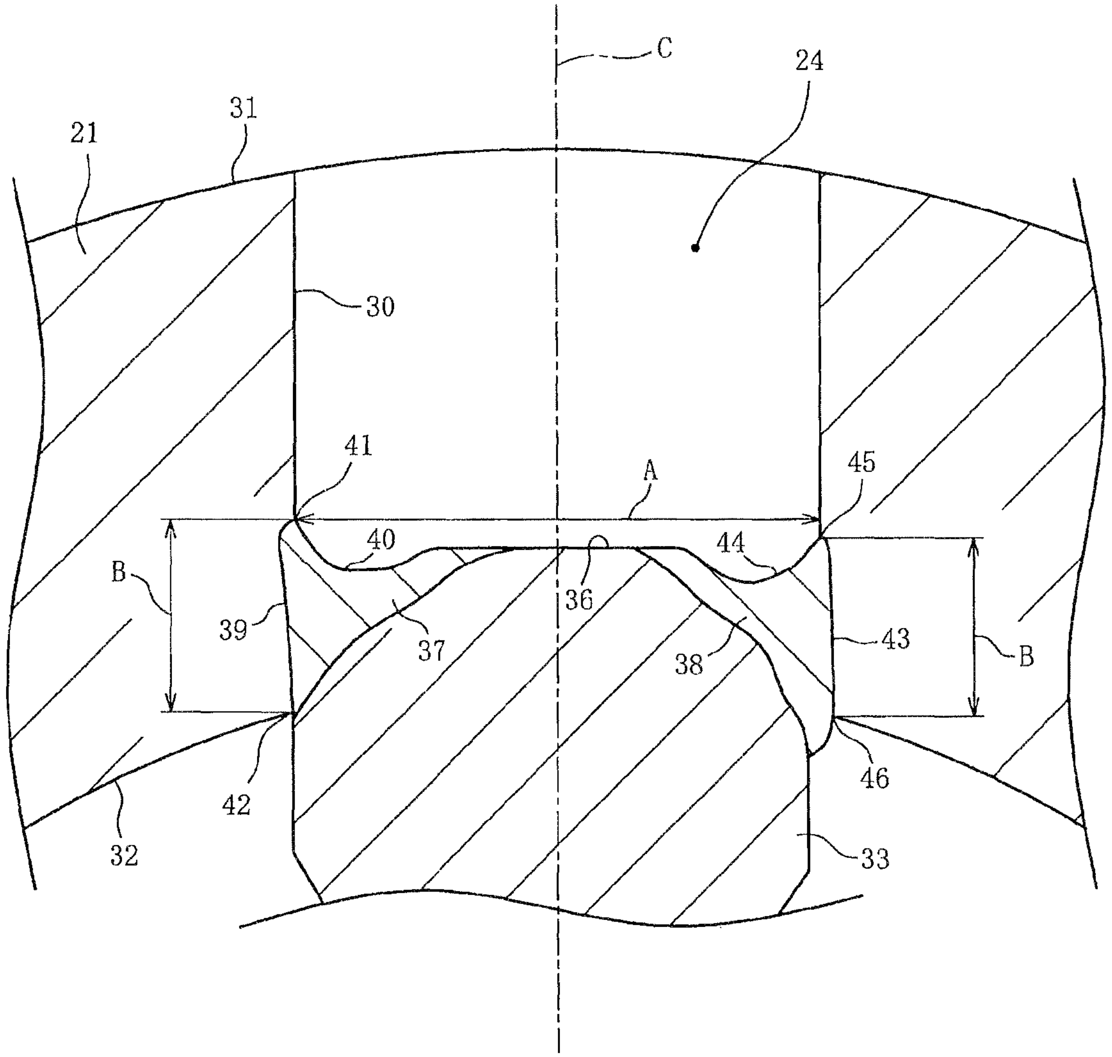

[FIG. 4]
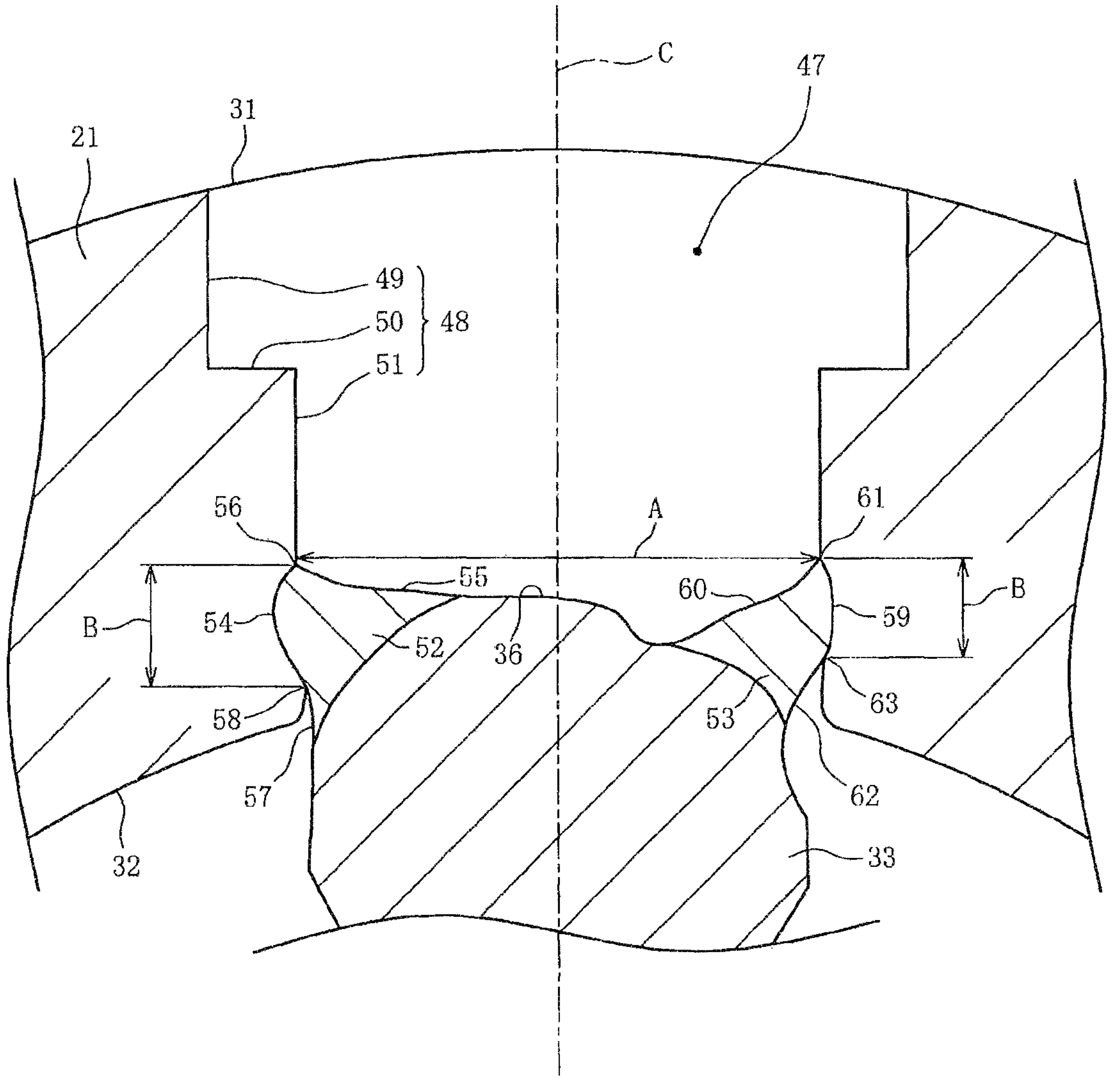

SPARK PLUG

FIELD OF THE INVENTION

The present invention relates to a spark plug in which a ground electrode is connected to a metal shell via a melt portion.

BACKGROUND OF THE INVENTION

WO2021/140756 discloses conventional art relating to a spark plug including: a center electrode; a tubular metal shell in which the center electrode is insulated and held; and a ground electrode protruding from the metal shell toward the center electrode. In the conventional art, in a hole penetrating the metal shell, the ground electrode is connected to the metal shell via a melt portion.

In the conventional art, the joining area of the melt portion is restricted by the thickness of the metal shell penetrated by the hole and the size of the hole, and thus the strength of the melt portion might become low.

The present invention is made to solve the above problem, and an object of the present invention is to provide a spark plug that can ensure the strength of a melt portion.

SUMMARY OF THE INVENTION

In order to achieve the object, a first aspect of the present invention is directed to a spark plug including: a center electrode; a metal shell in which the center electrode is insulated and held, the metal shell including a cylindrical portion having an outer circumference provided with an external thread, the metal shell further including a hole penetrating the cylindrical portion in a radial direction; and a ground electrode protruding from the metal shell toward the center electrode and connected, in the hole, to the cylindrical portion via a melt portion, wherein, in a cross section including a center line of the hole and the melt portion, the melt portion has a part in contact with the cylindrical portion, and the part is present on an outer side in the radial direction relative to the ground electrode.

A second aspect is directed to the spark plug according to the first aspect, wherein, in the cross section including the center line of the hole and the melt portion, the spark plug satisfies $2<A/B\leq 15$ where A (mm) represents a size of the hole at an intersection between the part, of the melt portion, in contact with the cylindrical portion and an inner surface delimiting the hole, and B (mm) represents a distance of the part, of the melt portion, in contact with the cylindrical portion, the distance extending along the center line.

A third aspect is directed to the spark plug according to the first or second aspect, wherein the hole has a size unchanging in the radial direction of the cylindrical portion.

A fourth aspect is directed to the spark plug according to any one of the first to third aspects, further including a cap closing a front side of the metal shell, wherein the cap is provided with a through-hole through which an inside and an outside of a space formed through the closing by the cap are in communication with each other.

In the spark plug of the present invention, in the cross section including the center line of the hole provided in the cylindrical portion and the melt portion, the melt portion has a part in contact with the cylindrical portion, and the part is present on the outer side in the radial direction relative to the ground electrode. Since the part, of the melt portion, in contact with the cylindrical portion can be extended to the outer side in the radial direction of the cylindrical portion, the joining area of the melt portion can be made larger than that in a case where the melt portion is not present on the outer side in the radial direction relative to the ground electrode. Therefore, the strength of the melt portion can be ensured.

BRIEF DESCRIPTION OF THE DRAWINGS

FIG. 1 is a partial cross-sectional view of a spark plug according to a first embodiment.

FIG. 2 is an enlarged cross-sectional view of the spark plug at a portion indicated by II in FIG. 1.

FIG. 3 is a cross-sectional view of the spark plug taken along III-III in FIG. 2.

FIG. 4 is a cross-sectional view of a spark plug according to a second embodiment.

DETAILED DESCRIPTION OF THE INVENTION

Hereinafter, preferred embodiments of the present invention will be described with reference to the accompanying drawings. FIG. 1 is a partial cross-sectional view of a spark plug 10 according to one embodiment. FIG. 1 shows a cross section, including an axial line O, of a front end portion of the spark plug 10. In FIG. 1, the lower side on the drawing sheet is referred to as a front side of the spark plug 10, and the upper side on the drawing sheet is referred to as a rear side of the spark plug 10 (the same applies to FIG. 2). As shown in FIG. 1, the spark plug 10 includes an insulator 11, a center electrode 15, a metal shell 20, and a ground electrode 25.

The insulator 11 is a substantially cylindrical member having an axial hole 12 extending along the axial line O and is formed from a ceramic such as alumina having excellent mechanical properties and excellent insulation properties at a high temperature. The insulator 11 includes an engaged-and-fixed portion 13 and a front end portion 14 adjacent to the front side of the engaged-and-fixed portion 13. The outer diameter of the front end portion 14 is smaller than the outer diameter of the engaged-and-fixed portion 13.

The center electrode 15 is disposed in the axial hole 12 along the axial line O over at least a range from the engaged-and-fixed portion 13 to the front end portion 14 of the insulator 11. The center electrode 15 includes: a rod-shaped base material 16 containing Ni as a main component; a tip 17 disposed at the front end of the base material 16 and containing at least one type among noble metals such as Pt, Rh, Ru, and Ir as a main component; and a melt portion 18 joining the tip 17 and the base material 16 to each other. The tip 17 and the melt portion 18 may be omitted.

The front end of the center electrode 15 protrudes from the insulator 11 to the front side. The center electrode 15 is electrically connected in the axial hole 12 to a metal terminal 19. The metal terminal 19 is a rod-shaped member to which a high-voltage cable (not shown) is connected, and is formed from an electrically-conductive metal material (for example, low-carbon steel or the like). The metal terminal 19 is fixed to the rear end of the insulator 11.

The metal shell 20 is a substantially cylindrical member formed from an electrically-conductive metal material (for example, copper, a copper alloy, low-carbon steel, or the like). The metal shell 20 is disposed on the outer circumference of the insulator 11. The metal shell 20 includes a cylindrical portion 21 located on the outer circumferential side relative to at least the engaged-and-fixed portion 13 and the front end portion 14 of the insulator 11. The cylindrical portion 21 is a portion having a cylindrical shape and having an outer circumference provided with an external thread 22, and has an inner circumference provided with a ledge portion 23. The external thread 22 is fitted to an internal thread provided on a plug hole of an engine (not shown). The ledge portion 23 is located on the front side relative to the engaged-and-fixed portion 13 of the insulator 11 and allows the engaged-and-fixed portion 13 to be engaged and fixed.

A portion, of the cylindrical portion 21, on the front side relative to the ledge portion 23 is provided with a hole 24 penetrating the cylindrical portion 21 in a radial direction. In the present embodiment, the hole 24 is provided at the position of the external thread 22, and a cross section of the hole 24 has a circular shape. The ground electrode 25 is disposed in the hole 24 of the cylindrical portion 21. The ground electrode 25 disposed in the hole 24 protrudes from the cylindrical portion 21 toward the center electrode 15.

Owing to a cap 26 closing the front side of the metal shell 20, a space 29 is formed on the inner side of the cap 26. The material of the cap 26 is exemplified by a metal material containing at least one type among Fe, Ni, Cu, and the like as a main component. In the present embodiment, the cap 26 is connected to the front side of the cylindrical portion 21 via a melt portion 28. The cap 26 is provided with a through-hole 27 through which the inside and the outside of the space 29 are in communication with each other.

FIG. 2 is an enlarged cross-sectional view of the spark plug 10 at a portion indicated by II in FIG. 1. An inner surface 30 delimiting the hole 24 provided in the cylindrical portion 21 is contiguous with an outer circumferential surface 31 of the cylindrical portion 21, and the ground electrode 25 is provided between an inner circumferential surface 32 of the cylindrical portion 21 and the inner surface 30 delimiting the hole 24. The ground electrode 25 includes: a base material 33 containing, for example, Ni as a main component; a tip 34 containing at least one type among noble metals such as Pt, Rh, Ru, and Ir as a main component; and a melt portion 35 joining the tip 34 and the base material 33 to each other. The tip 34 and the melt portion 35 may be omitted. An end surface 36 of the base material 33 is located in the hole 24. The hole 24 provided in the cylindrical portion 21 is closed by the ground electrode 25.

In the present embodiment, the base material 33 has a part located in the hole 24, and this part has a columnar shape and has a larger thickness than a portion, of the base material 33, to which the melt portion 35 is provided. The tip 34 of the ground electrode 25 is opposed to a side surface of the tip 17 of the center electrode 15, and a spark gap G is provided between the tip of the ground electrode 25 and the side surface of the center electrode 15.

The base material 33 of the ground electrode 25 is connected, in the hole 24, to the cylindrical portion 21 via a melt portion 37. The melt portion 37 is made by applying a laser beam to the end surface 36 of the base material 33 of the ground electrode 25 disposed in the hole 24. The melt portion 37 is formed by melting: a part, of the base material 33, including a portion of the end surface 36; and a part, of the cylindrical portion 21, including a portion of the inner surface 30 delimiting the hole 24.

For the spark plug 10 attached to the engine (not shown), fuel gas flows from a combustion chamber of the engine through the through-hole 27 into the space 29 by a valve operation of the engine. The spark plug 10 generates a flame kernel by electric discharge between the center electrode 15 and the ground electrode 25. When the flame kernel grows, the fuel gas in the space 29 is ignited and combusted. Owing to an expansion pressure generated by the combustion of the fuel gas, a gas flow including flame is generated, and the gas including the flame is jetted from the through-hole 27 to the combustion chamber. Owing to the jet flow of the flame, fuel gas in the combustion chamber is combusted. That is, the space 29 on the inner side of the cap 26 functions as a precombustion chamber provided in the combustion chamber of the engine.

FIG. 3 is a cross-sectional view, of the spark plug 10, taken along Ill-Ill in FIG. 2. In FIG. 3, a cross section of the cylindrical portion 21 and the ground electrode 25 including a center line C of the hole 24 is partially shown, the lower side on the drawing sheet is referred to as an inner side in the radial direction of the cylindrical portion 21, and the upper side on the drawing sheet is referred to as an outer side in the radial direction of the cylindrical portion 21 (the same applies to FIG. 4). The center line C of the hole 24 is a straight line passing through the geometric centers of a plurality of respective plane figures which are a plurality of cross sections each obtained by cutting the inner surface 30 delimiting the hole 24 such that the edge obtained by the cutting is a ring. In the present embodiment, the melt portion 37 is provided over the entire length of the circumference, about the center line C, of the hole 24. Thus, in FIG. 3 which is a cross-sectional view including the center line C, melt portions 37 and 38 are present on both respective sides relative to the center line C.

One melt portion 37 out of the melt portions has a part 39 in contact with the cylindrical portion 21. The part 39 is a joint (the interface between the melt portion 37 and the cylindrical portion 21) between: an intersection 41 between the inner surface 30 delimiting the hole 24 and a surface 40 on the outer side, in the radial direction of the cylindrical portion 21, of the melt portion 37; and an intersection 42 at which the inner circumferential surface 32 of the cylindrical portion 21 intersects with the melt portion 37. The part 39 is partially present on the outer side in the radial direction of the cylindrical portion 21 relative to the base material 33 (in the present embodiment, the end surface 36).

The part 39 is present on the outer side in the radial direction of the cylindrical portion 21 relative to the base material 33. As compared to a case where the melt portion 37 is not present on the outer side in the radial direction relative to the ground electrode 25, the part 39 is lengthened, whereby a joining area related to the strength of the melt portion 37 can be increased. Therefore, the strength of the melt portion 37 can be ensured.

In the present embodiment, the outermost position, in the radial direction, of the surface 40 of the melt portion 37 is the intersection 41. Excessive weld reinforcement of the melt portion 37 can be prevented, whereby stress to be applied to the intersection 41 can be decreased. As a result, the fatigue strength of each of the cylindrical portion 21 and the melt portion 37 can be prevented from decreasing.

The other melt portion 38 out of the melt portions has a part 43 in contact with the cylindrical portion 21. The part 43 is a joint (the interface between the melt portion 38 and the cylindrical portion 21) between: an intersection 45 between the inner surface 30 delimiting the hole 24 and a surface 44 on the outer side, in the radial direction of the cylindrical portion 21, of the melt portion 38; and an intersection 46 at which the inner circumferential surface 32 of the cylindrical portion 21 intersects with the melt portion 38. The part 43 is partially present on the outer side in the radial direction of the cylindrical portion 21 relative to the base material 33 (in the present embodiment, the end surface 36). The intersections 41 and 45 are present at portions, of the inner surface 30 delimiting the hole 24, on the inner side in the radial direction relative to the root of the external thread 22 (see FIG. 1), whereby the external thread 22 can be fitted to the internal thread provided on the plug hole.

The part 43 is present on the outer side in the radial direction of the cylindrical portion 21 relative to the base material 33. As compared to a case where the melt portion 38 is not present on the outer side in the radial direction relative to the ground electrode 25, the part 43 is lengthened, whereby a joining area related to the strength of the melt portion 38 can be increased. Therefore, the strength of the melt portion 38 can be ensured.

In the present embodiment, the outermost position, in the radial direction, of the surface 44 of the melt portion 38 is the intersection 45. Excessive weld reinforcement of the melt portion 38 can be prevented, whereby stress to be applied to the intersection 45 can be decreased. As a result, the fatigue strength of each of the cylindrical portion 21 and the melt portion 38 can be prevented from decreasing.

Both of the parts 39 and 43 are present on the outer side in the radial direction of the cylindrical portion 21 relative to the base material 33. Consequently, the strengths of the melt portions 37 and 38 can be made higher than those in a case where one of the parts 39 and 43 is present on the outer side in the radial direction of the cylindrical portion 21 relative to the base material 33.

When a part, of the base material 33, including the end surface 36 is melted such that the melt portions 37 and 38 further extend to the inner side in the radial direction of the cylindrical portion 21, the entireties of the parts 39 and 43 come to be present on the outer side in the radial direction of the cylindrical portion 21 relative to the base material 33. In this case, higher thermal energy for melting the base material 33 and the cylindrical portion 21 is applied to the base material 33 and the cylindrical portion 21 than in a case where the parts 39 and 43 are partially present on the outer side in the radial direction of the cylindrical portion 21 relative to the base material 33, whereby the base material 33 and the cylindrical portion 21 might be deformed. The feature in which the parts 39 and 43 are partially present on the outer side in the radial direction of the cylindrical portion 21 relative to the base material 33 as in the present embodiment makes it possible to ensure the strengths of the melt portions 37 and 38 and suppress deformation of the base material 33 and the cylindrical portion 21, in particular, deformation of the external thread 22.

In the present embodiment, the hole 24 has a size unchanging in the radial direction of the cylindrical portion 21. Consequently, a condition of laser welding for forming the melt portions 37 and 38 becomes easy to control. The phrase "the hole 24 has a size unchanging in the radial direction of the cylindrical portion 21" means that, with a plurality of diameters of the inner surface 30 delimiting the hole 24 (sizes of the hole 24) being measured over the entire length in the radial direction of the cylindrical portion 21, the difference between the maximum value and the minimum value among the diameters is not larger than 0.20 mm. The sizes of the hole 24 are each measured to the third decimal place, the maximum value and the minimum value among the sizes are obtained, and the difference between the maximum value and the minimum value is rounded to the second decimal place.

The intersection 41 of the melt portion 37 is located on the outer side in the radial direction of the cylindrical portion 21 relative to the intersection 45 of the melt portion 38. The spark plug 10 preferably satisfies $2<A/B\leq 15$ where A (mm) represents the size of the hole 24 at the intersection 41 located on the outer side in the radial direction out of the intersections 41 and 45 of the melt portions 37 and 38, and B (mm) represents the distance, along the center line C, of the part 39 including the intersection 41. A represents the length of a line segment obtained by bounding a straight line perpendicular to the center line C by the inner surfaces 30 delimiting the hole 24.

The reason why it is preferable to satisfy $2<A/B\leq 15$ is as follows. That is, there is a tendency that a larger value of A leads to a shorter length, in the radial direction, of the inner surface 30 delimiting the hole 24 excluding the region of the external thread 22, and thus it becomes difficult to, while ensuring the joining strength of the melt portion 37, form the melt portion 37 on the inner surface 30 without deforming the external thread 22. Further, there is a tendency that a larger value of B makes it easier to deform the external thread 22 on the cylindrical portion 21 by thermal energy at the time of forming the melt portion 37. Further, there is a tendency that smaller values of A and B lead to a smaller joining area of the melt portion 37, and thus, lead to a lower joining strength of the melt portion 37. Meanwhile, when $2<A/B>15$ is satisfied, the joining strength of the melt portion 37 can be ensured without deforming the external thread 22.

The spark plug 10 according to the present embodiment satisfies $2<A/B\leq 15$ also where B (mm) represents the distance, along the center line C, of the part 43 including the intersection 45 located on the inner side in the radial direction out of the intersections 41 and 45 of the melt portions 37 and 38. Since $2<A/B\leq 15$ is satisfied with each of the parts 39 and 43 located on both sides relative to the center line C, the strengths of the melt portions 37 and 38 can be improved.

The size A of the hole 24 is preferably within a range of $1\text{ mm}<A\leq 3\text{ mm}$. The reason for this is as follows. That is, a size A not larger than 1 mm makes it difficult to form the melt portions 37 and 38 by applying a laser beam into the hole 24. Meanwhile, a size A larger than 3 mm makes it difficult to form the melt portions 37 and 38 on the inner surface 30 delimiting the hole 24 excluding the region of the external thread 22.

In the spark plug 10, the front side of the metal shell 20 is closed by the cap 26 (see FIG. 1), fuel gas is combusted in the space 29 on the inner side of the cap 26, and the expansion pressure generated by the combustion is applied to the cap 26, the cylindrical portion 21, and the melt portions 37 and 38. The melt portions 37 and 38 need to have mechanical strengths that enable the melt portions 37 and 38 to endure this pressure. In the spark plug 10, the parts 39 and 43 of the melt portions 37 and 38 are present on the outer side in the radial direction of the cylindrical portion 21 relative to the base material 33, whereby the strengths of the melt portions 37 and 38 can be ensured. Therefore, this feature is suitable for the spark plug 10 including the cap 26.

A second embodiment will be described with reference to FIG. 4. In the first embodiment, description has been given regarding a case where the parts 39 and 43 of the melt portions 37 and 38 intersect with the inner circumferential surface 32 of the cylindrical portion 21. Meanwhile, in the second embodiment, description will be given regarding a case where parts 54 and 59, of melt portions 52 and 53, in contact with the cylindrical portion 21 are located between the outer circumferential surface 31 and the inner circumferential surface 32 of the cylindrical portion 21. In the second embodiment, the same components as those in the first embodiment are denoted by the same reference characters, and the description thereof is omitted.

FIG. 4 is a cross-sectional view, of a spark plug 10 according to the second embodiment, including a center line C of a hole 47 provided in the cylindrical portion 21. The hole 47 is provided at the position of the external thread 22 (see FIG. 1) of the cylindrical portion 21. An inner surface 48 delimiting the hole 47 includes: a first portion 49 intersecting with the outer circumferential surface 31 of the cylindrical portion 21; a second portion 50 adjacent to the inner side, in the radial direction, of the first portion 49; and a third portion 51 adjacent to the inner side of the second portion 50. The size of the hole 47 at the first portion 49 is larger than the size of the hole 47 at the third portion 51. The second portion 50 is provided near the root of the external thread 22.

In the present embodiment, the first portion 49 and the third portion 51 are cylindrical surfaces, and the second portion 50 is a flat surface perpendicular to the center line C. A melt portion is provided on the third portion 51 over the entire length of the circumference thereof about the center line C. Therefore, in FIG. 4, the melt portions 52 and 53 are present on both respective sides, relative to the center line C, of the third portion 51. The third portion 51 delimiting the hole 47 has a size unchanging in the radial direction of the cylindrical portion 21. Consequently, a condition of laser welding for forming the melt portions 52 and 53 becomes easy to control.

The size of the hole 47 is larger at the second portion 50 contiguous with the third portion 51 and the first portion 49 than at the third portion 51, and thus the external thread 22 is less likely to be influenced by heat due to laser welding for providing the melt portions 52 and 53 on the third portion 51 by applying a laser beam into the hole 47. Therefore, deformation of the external thread 22 can be suppressed.

One melt portion 52 out of the melt portions has a part 54 in contact with the cylindrical portion 21. The part 54 is a joint (the interface between the melt portion 52 and the cylindrical portion 21) between: an intersection 56 between the inner surface 48 (third portion 51) delimiting the hole 47 and a surface 55 on the outer side, in the radial direction of the cylindrical portion 21, of the melt portion 52; and an intersection 58 between the inner surface 48 delimiting the hole 47 and a surface 57 on the inner side, in the radial direction, of the melt portion 52. The part 54 is partially present on the outer side in the radial direction of the cylindrical portion 21 relative to the base material 33 (in the present embodiment, the end surface 36). The intersection 56 is located on the outermost side, in the radial direction, of the surface 55 of the melt portion 52.

The part 54 is present on the outer side in the radial direction of the cylindrical portion 21 relative to the base material 33. As compared to a case where the melt portion 52 is not present on the outer side in the radial direction relative to the ground electrode 25, the part 54 is lengthened, whereby a joining area related to the strength of the melt portion 52 can be increased. Therefore, the strength of the melt portion 52 can be ensured.

The other melt portion 53 out of the melt portions has a part 59 in contact with the cylindrical portion 21. The part 59 is a joint (the interface between the melt portion 53 and the cylindrical portion 21) between: an intersection 61 between the inner surface 48 delimiting the hole 47 and a surface 60 on the outer side, in the radial direction of the cylindrical portion 21, of the melt portion 53; and an intersection 63 between the inner surface 48 delimiting the hole 47 and a surface 62 on the inner side, in the radial direction, of the melt portion 53. The part 59 is partially present on the outer side in the radial direction of the cylindrical portion 21 relative to the base material 33 (in the present embodiment, the end surface 36). The intersection 61 is located on the outermost side, in the radial direction, of the surface 60 of the melt portion 53. The intersections 56 and 61 are present at portions, of the inner surface 48 delimiting the hole 47, on the inner side in the radial direction relative to the root of the external thread 22 (see FIG. 1).

The part 59 is present on the outer side in the radial direction of the cylindrical portion 21 relative to the base material 33. As compared to a case where the melt portion 53 is not present on the outer side in the radial direction relative to the ground electrode 25, the part 59 is lengthened, whereby a joining area related to the strength of the melt portion 53 can be increased. Therefore, the strength of the melt portion 53 can be ensured.

The intersection 61 of the melt portion 53 is located on the outer side in the radial direction of the cylindrical portion 21 relative to the intersection 56 of the melt portion 52. This spark plug 10 satisfies $2<A/B\leq 15$ where A (mm) represents the size of the hole 47 at the intersection 61 located on the outer side in the radial direction out of the intersections 56 and 61 of the melt portions 52 and 53, and B (mm) represents the distance, along the center line C, of the part 59 including the intersection 61. Consequently, the joining strength of the melt portion 53 can be ensured without deforming the external thread 22.

The spark plug 10 according to the present embodiment satisfies $2<A/B\leq 15$ also where B (mm) represents the distance, along the center line C, of the part 54 including the intersection 56 located on the inner side in the radial direction out of the intersections 56 and 61. Since $2<A/B\leq 15$ is satisfied with each of the parts 54 and 59 located on both sides relative to the center line C, the strengths of the melt portions 52 and 53 can be improved.

EXAMPLES

The present invention will be described in more detail with reference to examples, but the present invention is not limited to the examples.

An examiner prepared samples in which: external threads were provided on the outer circumferences of respective cylinders which each had a thickness of 1.5 mm and which were made of carbon steel, each cylinder having the same shape as that of the cylindrical portion 21 of the spark plug 10 according to the first embodiment; and holes having diameters ranging from 1 mm to 4 mm penetrated the regions of the external threads. The nominal diameter of each external thread was set to 10 mm, and the external thread was provided according to JIS B8031:2006. Each hole was formed in a circular shape having a size unchanging in the radial direction of the corresponding cylinder and was set such that the center line of the hole perpendicularly intersected with the center line of the cylinder.

A column was inserted into each hole such that an end surface of the column was located on the inner side in the radial direction relative to the root of the corresponding external thread. Then, a laser beam was applied to the end surface of each column so as to perform laser welding in which the entire circumference of the column was welded to the corresponding cylinder. A Ni-based alloy (NCF601) was used as a material of the column, the length of the column was set to 3 mm, and the diameter of the column was set to be smaller than the diameter of the hole by 0.1 mm. Consequently, sample Nos. 1 to 10 indicated in Table 1 were produced.

TABLE 1

| No. | A (mm) | B (mm) | A/B (—) | Stress (N/mm$^2$) | Result of Determination |
|---|---|---|---|---|---|
| 1 | 1.2 | 0.70 | 1.7 | — | P |
| 2 | 1.0 | 0.50 | 2.0 | 64 | P |
| 3 | 1.2 | 0.50 | 2.4 | 53 | G |
| 4 | 1.5 | 0.50 | 3.0 | 42 | G |
| 5 | 2.0 | 0.30 | 6.7 | 53 | G |
| 6 | 2.5 | 0.30 | 8.3 | 42 | G |
| 7 | 3.0 | 0.30 | 10.0 | 35 | G |
| 8 | 3.0 | 0.20 | 15.0 | 53 | G |
| 9 | 3.0 | 0.15 | 20.0 | 71 | P |
| 10 | 4.0 | 0.20 | 20.0 | — | P |

A pin was inserted into the hole of each sample, and a force toward the inner side in the radial direction of the cylinder was exerted to the column by using the pin. A maximum load (N) upon this exertion was measured. In each of sample Nos. 1 and 10, the external thread provided on the cylinder was deformed, and thus no maximum load was measured.

Next, each sample was cut so as to obtain a cross section including the center line of the column. An image of melt portions present in the cross section was taken with an optical microscope. Image analysis was performed to measure: the size A (mm) of the hole at an intersection on either of the melt portions; and the distance B (mm) in the melt portion including the intersection at which the size A of the hole was measured. A value resulting from multiplying the size A (the diameter of the circle) by a circle ratio and the distance B was regarded as the joining area (mm$^2$) of the melt portion, and a stress (N/mm$^2$) was obtained by dividing the maximum load by the joining area.

With a value resulting from adding a safety factor to a pressure obtained upon occurrence of destructive abnormal combustion (so-called mega-knock) being 60 N/mm$^2$, a sample in which the stress was not higher than 60 N/mm$^2$ was determined as being good (G), and a sample in which the stress was higher than 60 N/mm$^2$ was determined as being poor (P). Sample Nos. 1 and 10 in which the external threads were deformed were also determined as being poor (P). The values A, B, and A/B, the stress, and the result of the determination regarding each sample are indicated in Table 1.

As indicated in Table 1, sample Nos. 3 to 8 satisfying $2.0<A/B\leq 15.0$ were determined as being G, whereas sample Nos. 1 and 2 satisfying $A/B\leq 2.0$ and sample Nos. 9 and 10 satisfying $A/B>15.0$ were determined as being P. According to these examples, it has been clarified that satisfaction of $2.0<A/B\leq 15.0$ makes it possible to suppress deformation of the external thread and ensure the strength of the melt portion.

Although the present invention has been described above based on the embodiments, the present invention is not limited to the above embodiments at all. It can be easily understood that various modifications may be made without departing from the gist of the present invention.

Although a case where the hole 24, 47 has a circular shape has been described in each embodiment, the present invention is not necessarily limited to this case. Another shape of the hole 24, 47 is exemplified by an elliptical shape, a semi-circular shape, polygonal shapes such as a triangular shape, a quadrangular shape, and a hexagonal shape, and a polygonal shape having rounded corners. The cross-sectional shape of the ground electrode 25 disposed in the hole 24, 47 is set as appropriate according to the shape of the hole 24, 47.

Although a case where the melt portion is continuously provided on the circumference, about the center line C, of the hole 24, 47 has been described in each embodiment, the present invention is not necessarily limited to this case. As a matter of course, the melt portion may be intermittently provided on the circumference, about the center line C, of the hole 24, 47. In the case where the melt portion is intermittently provided in the hole 24, 47, the melt portion in the cross section including the center line C of the hole 24, 47 and the melt portion is not necessarily present on both sides relative to the center line C as in the embodiment and may be present on only one side relative to the center line C.

Although a case where the end surface 36 of the base material 33 of the ground electrode 25 partially remains without being melted has been described in each embodiment, the present invention is not necessarily limited to this case. The end surface 36 of the base material 33 may be entirely melted to become the melt portion 37, 38, 52, 53 such that the end surface 36 disappears. In the case where the end surface 36 of the base material 33 disappears, the part 39, 43, 54, 59, of the melt portion 37, 38, 52, 53, in contact with the cylindrical portion 21 can be said to be present on the outer side in the radial direction relative to the ground electrode 25 when the part 39, 43, 54, 59 is at least partially located on the outer side in the radial direction of the cylindrical portion 21 relative to the outermost position, in the radial direction, of the interface between the melt portion and the base material 33.

Although a case where the size of the inner surface 30 delimiting the hole 24 or the third portion 51 delimiting the hole 47 is unchanging in the radial direction of the cylindrical portion 21 has been described in each embodiment, the present invention is not necessarily limited to this case. As a matter of course, the cylindrical portion 21 may be provided with a hole having a so-called tapered shape such that the size of the hole decreases from the outer side toward the inner side in the radial direction of the cylindrical portion 21, and the ground electrode 25 may be disposed in this hole.

Although a case where the hole 24, 47 is provided in the region of the external thread 22 on the cylindrical portion 21 has been described in each embodiment, the present invention is not necessarily limited to this case. For example, as a matter of course, a tubular portion having no external thread 22 may be provided at a front end portion of the cylindrical portion 21, a hole may be formed in the front end portion (tubular portion) of the cylindrical portion 21, and the ground electrode 25 may be provided in the hole.

Although a case where a portion, of the ground electrode 25, that is located in the hole 24, 47 has a larger thickness than a portion, of the ground electrode 25, that is close to the axial line O has been described in each embodiment, the present invention is not necessarily limited to this case. As a matter of course, the thickness of the portion, of the ground electrode 25, that is located in the hole 24, 47 and the thickness of the portion, of the ground electrode 25, that is close to the axial line O may be set to be equal to each other.

Although a case where the spark gap G is provided between the side surface of the center electrode 15 and the tip of the ground electrode 25 has been described in each embodiment, the present invention is not necessarily limited to this case. The spark gap G may be provided between the front end of the center electrode 15 and a side surface of the ground electrode 25 by: shifting, to the front side, the position of the hole 24, 47 provided in the cylindrical portion 21; and slightly lengthening the ground electrode 25.

Although a case where the cap 26 is disposed on the front side of the metal shell 20 has been described in each embodiment, the present invention is not necessarily limited to this case. As a matter of course, the cap 26 may be omitted.

Although a case where the cap 26 having a hemispherical shape is disposed on the metal shell 20 has been described in each embodiment, the present invention is not necessarily limited to this case. The shape of the cap 26 may be set as appropriate. Another shape of the cap 26 is exemplified by the shape of a cylinder with a bottom and the shape of a disc.

Although a case where the cap 26 is welded to the metal shell 20 has been described in each embodiment, the present invention is not necessarily limited to this case. As a matter of course, a tubular member having a front end provided with the cap may be prepared and connected to the metal shell 20, thereby forming the space 29. The tubular member is a tubular member having a front end closed by the cap and has an inner circumferential surface provided with an internal thread to be engaged with the external thread 22 on the metal shell 20. The tubular member has an outer circumferential surface provided with an external thread to be engaged with the internal thread on the plug hole of the engine. The cap is disposed on the front side of the metal shell 20 by engaging the internal thread on the tubular member with the external thread 22 on the metal shell 20. This cap is provided with the through-hole 27.

Means for connecting the tubular member to the metal shell 20 and providing the cap to the front side of the metal shell 20 is not limited to engagement of the internal thread on the inner circumferential surface of the tubular member with the external thread 22 on the metal shell 20. As a matter of course, the tubular member may be connected to the metal shell by another means. Examples of the other means include joining between the tubular member and the metal shell through welding or the like. The material of the tubular member is exemplified by: a metal material such as a Ni-based alloy or stainless steel; or a ceramic such as silicon nitride.

DESCRIPTION OF REFERENCE NUMERALS

10 spark plug
15 center electrode
20 metal shell
21 cylindrical portion
22 external thread
24,47 hole
25 ground electrode
26 cap
27 through-hole
29 space
30 inner surface
37, 38, 52, 53 melt portion
39, 43, 54, 59 part in contact with the cylindrical portion in the melt portion
41, 61 intersection
C center line

What is claimed is:

1. A spark plug comprising:
a center electrode;
a metal shell in which the center electrode is insulated and held, the metal shell including a cylindrical portion having an outer circumference provided with an external thread, the metal shell further including a hole penetrating the cylindrical portion in a radial direction; and
a ground electrode protruding from the metal shell toward the center electrode and connected, in the hole, to the cylindrical portion via a melt portion, wherein, in a cross section including a center line of the hole and the melt portion, the melt portion has a part in contact with the cylindrical portion, and the part is present on an outer side in the radial direction relative to the ground electrode,
wherein at least a portion of the melt portion is located radially outward from an outermost radial portion of the ground electrode.

2. The spark plug according to claim 1, wherein, in the cross section including the center line of the hole and the melt portion, the spark plug satisfies $2<A/B\leq 15$ where A (mm) represents a size of the hole at an intersection between the part and an inner surface delimiting the hole, and B (mm) represents a distance, along the center line, of the part.

3. The spark plug according to claim 1, wherein the hole has a size unchanging in the radial direction of the cylindrical portion.

4. The spark plug according to claim 1, further comprising:
a cap closing a front side of the metal shell,
wherein the cap is provided with a through-hole through which an inside and an outside of a space formed through the closing by the cap are in communication with each other.

* * * * *